United States Patent [19]

Nonoyama et al.

[11] Patent Number: 4,681,642
[45] Date of Patent: Jul. 21, 1987

[54] CAST IRON MAKING BY CERIUM ADDITION

[75] Inventors: Hideo Nonoyama; Toshiharu Fukuizumi; Akiyoshi Morita, all of Toyota, Japan

[73] Assignee: Toyota Jidosha Kabushiki Kaisha, Toyota, Japan

[21] Appl. No.: 800,153

[22] Filed: Nov. 20, 1985

[51] Int. Cl.$^4$ .............................................. C22C 37/00
[52] U.S. Cl. ..................................... 148/321; 148/903
[58] Field of Search ................ 148/35, 4, 37, 903, 148/902, 321, 323; 75/123 CB; 219/121 L, 121 LM

[56] References Cited

U.S. PATENT DOCUMENTS 4,000,011  12/1976  Sato et al. ........................... 148/35
4,450,019   5/1984  Satou et al. .......................... 148/35

Primary Examiner—Melvyn J. Andrews
Assistant Examiner—S. Kastler
Attorney, Agent, or Firm—Oblon, Fisher, Spivak, McClelland & Maier

[57] ABSTRACT

This invention concerns an improvement in cast iron material and chilled iron material. The cast iron material has a C.E. value of not more than 4.3 in which cerium is added in the form of a mischmetal upon casting to a cerium content of from 0.005 to 0.035 wt %. The chilled cast iron article has a chilled layer formed by remelting at least a portion of the surface of the cast iron of a predetermined shape composed of the above-mentioned cast iron by a high density energy source such as tungsten inert gas (TIG) arc, laser or electron beam.

2 Claims, 9 Drawing Figures

Mg
40 μm

Mg
40 μm

Ce
40 μm

Ce
40 μm

CAST IRON MAKING BY CERIUM ADDITION

BACKGROUND OF THE INVENTION

1. Field of the Invention

This invention concerns cast iron material and chilled cast iron.

2. Prior Art

As a means for improving the wear resistance at a specific surface of a cast iron article, there has been known a so-called remelting surface hardening treatment which comprises partially remelting only the surface of the cast iron article by a high energy souce such as TIG (Tungsten Inert Gas) arc, plasma arc or electron beam in a protection gas atmosphere such as an inert gas and rapidly cooling the remelted portion by the self-cooling performance of the article, thereby forming a chilled layer composed of a hard and dense chilled structure. According to the remelting surface hardening treatment, only the specific surface of the cast iron article can be hardened to thereby improve the wear resistance thereof with no change in the properties of the main portion thereof.

However, when the remelting surface hardening treatment is applied to gray cast iron which is most ordinary as a cast iron and, particularly, if the scanning rate of the high energy of source to the cast iron article is high, there has been a problem of blowhole generation in the remelted portion. Since graphite in the gray cast iron matrix constitutes individual cells in the form of relatively coarse flake graphite involving the gas therein, when the graphite is exposed to a highly activated state under heating by the high energy source, it chemically reacts mainly with the oxygen in the gas into carbon monoxide or the like, also under the effect of the oxygen existent in the cast iron matrix or the oxygen intruding from the atmosphere while breaking through the shielding of the protection gas. The gas thus resulted produces gas bubbles in the molten iron to rapidly cool and coagulate the molten iron and trapped to remain as blowhole in the remelted portion. Such blowholes appear at the surface of the cast iron article when machining such as grinding is applied to the remelted portion, to prevent the improvement in the wear resistance of the remelted portion, as well as impair the appearance of the article or the worsen degree of surface finishment for the article.

In order to prevent the blowhole generation, special covers have been used for covering the remelted portion or the flow rate of the protection gas has been increased in order to form a sufficient protection shielding to the remelted portion. However, since the formation of carbon monoxide caused by the oxygen existent in the cast iron cannot be prevented by these methods, blowhole generation cannot completely be depressed and they bring about an additional problem of increasing the cost for the remelting surface hardening treatment.

There has also been known effective, as another method for preventing blowhole generation, to preheat the cast iron article to a temperature of about 400–500° C. prior to the remelting treatment. However, this method requires additional step and apparatus for the preheating treatment, which increases the energy consumption and treatment cost, as well as lowers the self-cooling performance of the cast iron article due to the preheating treatment for the cast iron article prior to the remelting treatment thereby failing to provide a sufficient improvement in the hardness of the thus obtained remelting chilled texture.

It may further be considered, as a further method of depressing the blowhole generation, to reduce the scanning rate of the high energy source to the cast iron article, but this increases the amount of heat intruding to the cast iron article, making it difficult to obtain a sufficient cooling rate only with the self-cooling of the cast iron article and requires an additional forcible cooling means.

As a still further method of depressing the blowhole generation, it has been recommended to decrease the specific surface area of individual graphite grains in contact with the iron matrix in view of the graphite shape in the matrix such as eutectic graphite, chunky graphite or spherical graphite (for instance, in Japanese patent Laid-Open Nos. 85,926/1982 and 149,420/1982, and U.S. Pat. No. 4,000,011). However, these forms of graphite involve the respective problems as described below.

Referring at first, eutectic graphite is generally formed by using titanium. Although blowholes can significantly be decreased, large blowholes are resulted in places. This is attributable to the inclusion of dross increased at the surface of the molten iron caused by the addition of titanium. Further, titanium remains upon casting in the molten iron as a reversing material and this means that an exclusive casting line has to be used or the reversing agent has to be checked in a great number of steps.

Referring then to chunky graphite, the cast iron containing such a shape of graphite with the sphericalizing rate from 20 to 70% is generally called as vermicular cast iron, although having high C.E. (Carbon Equivalent) value and not belonging to the gray cast iron. A molten iron treating agent usually based on magnesium is used to provide a significant effect against the blowhole generation. However, since the magnesium is used as the treating agent, molten iron is splashed and white flash or smoke is resulted due to the evaporation of magnesium during handling of the molten iron to bring about problems in safety or sanitary point of view. Further, since the sphericalizing rate is not stable, shrinkaging property is dispersed. Accordingly, a larger amount of riser than required is necessary in order to obtain crude materials at high quality, to worsen the yield and increase the cost. Further, since the magnesium in the matrix inhibits the flowability of the molten pool upon applying the remelting treatment, a desired hardening depth cannot be secured unless the amount of intruding heat is increased, to provide an adverse effect on the energy saving. Further, since the specific surface area is smaller as compared with that of the A-type graphite, not-melted residue of graphite is resulted upon remelting, making it difficult to form a uniform remelted chilled layer.

In the case of spherical graphite cast iron using magnesium as the sphericalizing agent, the similar disadvantage to that in the chunky graphite is resulted and the situation is further worsened. Further, in view of the cost, since magnesium has to be incorporated by from 0.040 to 0.080% and the C.E. value is as high as from 4.5 to 5.0, larger amount of C and Si has to be used to increase the cost. The C.E. value used herein is defined as follows:

$$\text{C.E. value} = \text{Total carbon} + \tfrac{1}{3} \text{ silicon wt\%}$$

In this case, 4.3 of the C.E. value indicates eutectic, and not more than 4.3 of the C.E. value indicates hypoeutectic. Further, the generation of slags after the molten iron treatment is remarkable and the amount of the slag catcher used and the number of slag-removing steps at high temperature is also increased.

In the case of using calcium as the sphericalizing agent, light and less soluble calcium readily tends to float on the upper portion of the molten metal and react with oxygen into slags and the yield is as low as 20–50%.

SUMMARY OF THE INVENTION

In view of the foregoing various problems in applying the remelting surface hardening treatment to cast iron, the present inventors have conducted the remelting surface hardening treatment under various conditions for various cast iron materials and, as a result, have found that all of the foregoing problems can be overcome, without preheating or using a great amount of protection gas, that the remelting surface hardening treatment can be carried out while completely depressing the generation of blowholes substantially even if the scanning rate of the high energy source is set to a relatively high level and that a chilled layer comprising a hard and dense chilled structure mainly composed of cementite can be formed, by adding a mischmetal to an ordinary cast iron having a C.E. value of less than 4.3 so as to provide Ce content of from 0.005 to 0.035% by weight. The mischmetal used mentioned herein is a mixture of cerium group rare earth elements (hereinafter referred as Ce-group elements) as a semi-product in the course of refining them, which usually contains about from 40 to 50% of cerium and about from 20 to 40% La.

The object of this invention is to provide, based on the findings obtained as the result of various experimental studies made by the present inventors, inexpensive cast iron material, for which remelting surface treatment by a high energy source can be applied at a reduced cost and efficiently while completely depressing the generation of the blowholes substantially and by which a chilled layer free from blowholes and excellent in the wear resistance can be formed.

Another object of this invention is to provide chilled cast iron article having a uniform, hard and dense chilled texture mainly composed of cementite, free from blowholes and not containing undissolved graphite and, accordingly, excellent in the wear resistance by the remelting surface hardening treatment using the high energy source.

A further object of this invention resides in the simplification of the steps and the improvement in the working circumstance in the casting process.

DETAILED DESCRIPTION OF THE INVENTION

Figure 2:
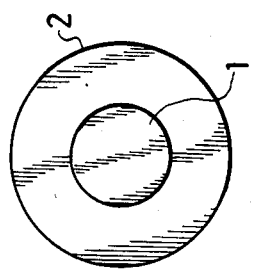
FIG. 2 is a right side elevational view of the test piece shown in FIG. 1.

In the present invention, the simplification of the steps and the improvement in the working circumstance in the casting process can be also achieved. That is, cerium is readily deoxidized when remelted in an induction heating furnace, and discharged as slags, neither the separation of reversing material nor the exclusive use of the cast line is necessary. Further, since cerium can be incorporated into the molten iron in the from of a mischmetal by merely adding it to a ladle, the vapor pressure is not so high as in the case of using magnesium and, accordingly, generation of white flash or smoke can be prevented to avoid the worsening in the working circumstance. Furthermore, since the addition amount (volume) of the cerium is small, slags are scarcely generated.

Furthermore, since there is no hard oxide film as in the case of using magnesium upon casting into a die, the molten metal flowability is improved to readily form casting articles free from defect. In addition, since no larger amount of riser is required, the casting yeild can be improved significantly. Furthermore, since the mass effect is moderated and no free cementite is generated, cutting property in the fabrication step can be improved.

In the cast iron material according to this invention, since readily oxidizable Ce series element is added into the molten iron, the molten iron is deoxidized to reduce the oxygen concentration existent in the cast iron material upon remelting. Further, since the residual active cerium series element (mainly dispersed in graphite) has a greater oxide forming tendency than carbon in a remelting temperature region, it can prevent the reaction between oxygen intruding from the atmosphere into the remelted portion breaking through the shielding of the protection gas or oxygen existent in the cast iron, particularly, in graphite and the carbon of the graphite.

Accordingly, since this can inhibit the formation of carbon monoxide or the like responsible to the blowhole generation, the remelting surface hardening treatment can be carried out while completely depressing the generation of blowholes substantially with no preheating treatment or using a large amount of the protection gas even if the scanning rate of the high energy source is set to a relatively high value, whereby a chilled layer comprising a chilled texture free from blowholes and mainly composed of cementite can be formed efficiently and inexpensively.

The cerium group elements mean herein those rare earth elements such as cerium, lanthanum, and neodymium, i.e., those rare earth elements contained in the mischmetal. The active cerium series element, for example, cerium, can be considered to remain in the form of $Ce_2O_3$ or the like still possessing a chemical activity with the oxygen, not completely oxidized into $CeO_2$.

Further, in the chilled cast iron article according to this invention, no blowholes are present in the chilled layer and the chilled layer comprises a hard and dense uniform chilled structure containing no undissolved graphite and is mainly composed of cementite. Therefore, in the chilled layer of the chilled cast iron article according to this invention, no blowholes appear on the surface when the machining such as grinding is applied thereto and, accordingly, the degree of finishment and the appearance of the processed surface can be improved as compared with those in the conventional chilled cast iron article. Further, the chilled larger layer of the chilled cast iron article according to this invention is excellent in the wear resistance over the chilled layer of the conventional chilled cast iron article.

For the spherical graphite cast iron in which the shape of the graphite is substantially in a complete sphere or the vermicular cast iron in which the shape of the graphite is chunky, it has been confirmed by the present inventors or described in U.S. Pat. No. 4,000,011, that the remelting surface hardening treatment can be applied while depressing the generation of blowholes by setting the scanning rate of the high energy source to a relatively high level without requiring preheating or using a great amount of the protection gas. However, the spherical graphite cast iron or the vermicular cast iron has C.E. value generally of about 4.4–5.0 and contains a relatively large amount of carbon and silicon. Further, since it is necessary to incorporate from 0.02 to to 0.080% of magnesium as the sphericalizing agent, these cast iron materials are poor in the fluidity of molten metal as compared with the cast iron material according to this invention, and they are expensive as well since the composition and the graphite shape have to be controlled strictly.

Furthermore, since the viscosity of the molten pool is high, the graphite in the matrix tends to be trapped and remain undissolved in the course it is floated up and included in the iron texture during the remelting process. On the contrary, the cast iron material according to this invention requires no strict control for the composition and the graphite shape when the C.E. value is not more than 4.3 and cerium is added in the form of a mischmetal so as to provide the cerium content of from 0.005 to 0.035% by weight, and it is suitable to the remelting surface hardening treatment, as well as it enables to obtain a cast iron material which is excellent in the fluidity of molten metal and less expensive as compared with the spherical graphite cast iron or the like.

Specifically, the graphite shape in the cast iron material according to this invention is substantially A–E type and the apparent density of the graphite is larger than that of the spherical or vermicular graphite and, thus less tends to be floated. Further, since the specific surface area to the molten metal is larger, the graphite is readily dissolved into the iron matrix and less remains undissolved. Furthermore, since the addition of the cerium does not worsen the flowability of the molten pool as in the case of magnesium, no undissolved graphite remains thereby enabling to form a uniform chilled layer.

The above various advantages can be demonstrated from the experimental results as described below.

EXAMPLE 1

The following experiments were conducted for specifically observing the effect of adding magnesium or mischmetal (cerium series elements) in order to depress the blowhole generation.

The addition of a deoxidizer into molten metal for the casting was investigated to reduce active oxygen in molten metal and to depress gasification in the remelted portion during the remelting treatment. Especially to depress gasification, it was necessary to choose the chemical element which reacted with oxygen easily than carbon at remelting temperature. Therefore, we selected magnesium and cerium in consideration of the standard free energies of the oxide formation.

Magnesium is familiar to us as an additional element to manufacture vermiculer cast iron or ductile cast iron.

On the other hand, cerium is one of the rare earth metals, and the single use of it was scarcely reported in the field of casting technics. In addition, it is never used alone, because the manufacturing cost rises. Therefore, mischmetal which included Ce, La, Nd, Pr and Sm and the like, so-called Ce-group elements, was selected instead of cerium. Here, Ce-group elements have almost the same properties as cerium.

Figure 5:
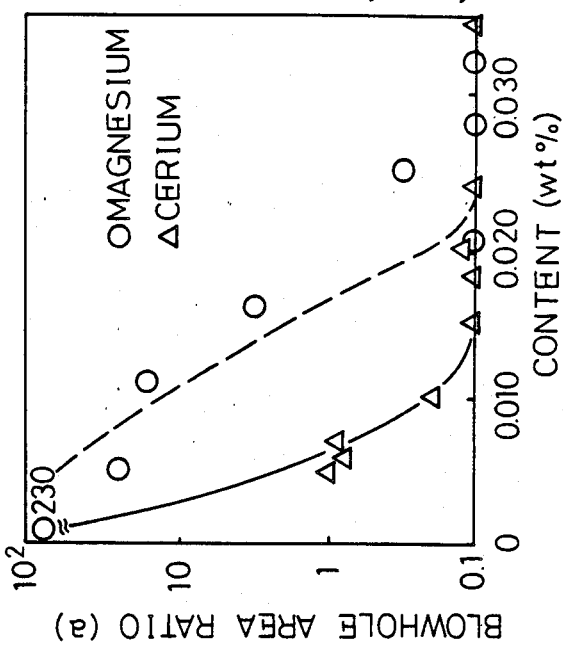
FIG. 5 is a graph showing the relationship between the addition amount of magnesium or mischmetal and the blowhole area ratio.

Table 1 shows the chemical compositions of the camshaft for the test. FIG. 5 is a graph showing the relationship between the addition amount of Mg or Ce and the blowhole area ratio. The blowhole area ratio a is a value determined by the equation shown in page 21 of the present specification. As shown in FIG. 5, the depression effect of blowhole by using cerium is greater than that by using magnesium. That is, in order to depress the blowholes, the magnesium content must be needed about

TABLE 1

| ADDITION | NO. | MAIN ELEMENTS | Mg | Ce |
| --- | --- | --- | --- | --- |
| MAGNESIUM | 1 | C: 3.30–3.45 | 0 | — |
|  | 2 | Si: 1.95–2.10 | 0.006 | — |
|  | 3 | after | 0.011 | — |
|  | 4 | ( inoculation ) | 0.016 | — |
|  | 5 | 2.15–2.40 | 0.018 | — |
|  | 6 | Mn: 0.60–0.70 | 0.020 | — |
|  | 7 | S: 0.002–0.003 | 0.025 | — |
|  | 8 | Cr: 0.35–0.45 | 0.028 | — |
|  | 9 | Mo: 0.15–0.23 | 0.032 | — |
| MISCHMETAL | 10 | Ni: 0.15–0.18 | — | 0.005 |
|  | 11 | Fe: balance | — | 0.006 |
|  | 12 |  | — | 0.007 |
|  | 13 |  | — | 0.010 |
|  | 14 |  | — | 0.015 |
|  | 15 |  | — | 0.018 |
|  | 16 |  | — | 0.020 |
|  | 17 |  | — | 0.024 |
|  | 18 |  | — | 0.035 | twice as much as cerium content.

The experimental results support our presumption that the principal factor of blowhole generation is the oxygen existence in cast iron.

At the beginning of the experiments, it was supposed that magnesium or mischmetal in the cast iron matrix would trap active oxygen positively. However, our presumption was not right, that was to say, there were difference effects between magnesium addition and cerium addition.

Figure 6:
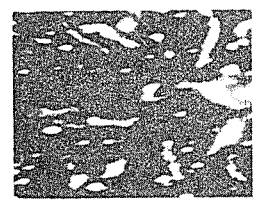
FIG. 6 is an IMMA (Ion Microprobe Mass Analyzer) photograph for the matrix of No. 9 in Table 1 in which magnesium is added.
Figure 7:
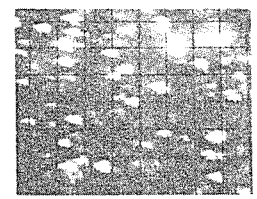
FIG. 7 is an IMMA photograph for the chilled portion of No. 9 in Table 1 in which magnesium is added.
Figure 8:
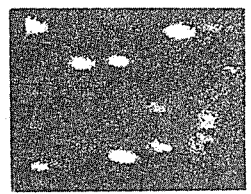
FIG. 8 is an IMMA photograph for the matrix of No. 13 in Table 1 in which mischmetal is added.
Figure 9:
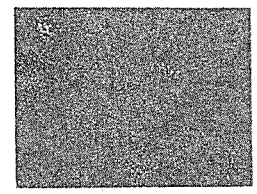
FIG. 9 is an IMMA photograph for the chilled portion of No. 13 is Table 1 in which a mischmetal is added.

FIGS. 6–9 show the result of the observation by using IMMA Analyzer (Ion Micro-Probe Mass Analyzer). The observed areas are in the matrix and the remelted portion. FIG. 6 shows an IMMA photograph for the matrix of the cast iron in which the magnesium was added by an amount of 0.032 wt% in the Experiment No. 9, and FIG. 7 is an IMMA photograph for the chilled portion in the same composition as described above. While on the other hand, FIG. 8 is an IMMA photograph for the matrix of the cast iron in which the cerium was added by an amount of 0.010 wt% in the Experiment No. 13, and FIG. 9 is an IMMA photograph for the chilled portion in the same composition. In these pictures, the white indicates the metal elements of the Ce-group elements such as Ce, and Mg, and the black indicates the other elements.

Of the magnesium addition, the spots of aggregated magnesium were observed in the chilled layer shown in FIG. 7 as well as in the matrix shown in FIG. 6.

Accordingly, it is supposed that magnesium oxides are already formed in the molten cast iron before the remelting treatment, and that they are not melted again even by the high-density energy because of its higher melting point. The principal role of magnesium in molten cast iron seems to be the reduction of active oxygen in the cast iron matrix.

On the contrary, as shown in FIG. 9, the dispersion of cerium into the chilled layer was very fine. The result suggests that cerium compounds in the cast iron matrix are melted during the remelting treatment by high-density energy. The cerium compounds which tend to dissolve during this treatment may be $Ce_2O_3$ or the like whose melting point is 1,690° C.

If all of the mischmetal added into molten cast iron are assumed to be used to reduce active oxygen in the cast iron matrix as well as magnesium, the result of blowhole depression does not fit the stoichiometric theory. In order to depress the blowholes, the mishmetal content must be needed about twice as much as magnesium content inversely.

Accordingly, it was supposed that the role of mischmetal was not only the reduction of active oxygen in the cast iron matrix. So, we considered the another roles of added mischmetal were as follow:

The first role may be the deoxidation in the portion remelted by the high-density energy. The reason is that $Ce_2O_3$ or the like formed in molten metal is the intermediate article of $CeO_2$, and therefore $Ce_2O_3$ possesses deoxidizing capacity yet.

The second role is the acceleration of gas diffusion in the remelted portion. Of the flowability of molten metal in the remelted portion, a material in which mischmetal was added showed better result than a material in which magnesium was added. The fact suggests that the gases generated in the remelted portion diffuse rapidly, and that they are expelled smoothly from there. The result seemed to be same as the preheating treatment was applied to the camface.

The result obtained demonstrate that the cast iron material in which mischmetal is added is more effective for blowhole depression than magnesium added cast iron material.

In the cast iron material according to this invention, it is difficult to sufficiently depress the blowhole generation if the cerium content is as insufficient as less than 0.005%. While on the other hand, if the cerium content is increased to more than 0.035%, inverse chill is increased to change the uniform pearlite structure into a mixed texture of pearlite, ferrite and reverse chill. Accordingly, the cerium content should be from 0.005 to 0.035%.

Table 2 shows the chemical compositions of

TABLE 2

| NO. | composition of the cast iron material | | | | | | | | C.E. value | Graphite shape | Blowhole area ratio (a) | Reference |
|---|---|---|---|---|---|---|---|---|---|---|---|---|
| | C | Si | Mn | P | S | Sb | Ce | Fe | | | | |
| 1-1 | 2.90 | 2.10 | 0.70 | 0.03 | 0.03 | 0.010 | 0 | balance | 3.60 | type E | 42 | fine chill present |
| 1-2 | 2.95 | 2.05 | 0.60 | 0.02 | 0.03 | 0.010 | 0.005 | balance | 3.63 | type E | 0 | fine chill present |
| 1-3 | 2.90 | 2.00 | 0.70 | 0.02 | 0.02 | 0.015 | 0.011 | balance | 3.57 | type E | 0 | fine chill present |
| 1-4 | 2.94 | 2.00 | 0.65 | 0.03 | 0.03 | 0.010 | 0.023 | balance | 3.61 | type E | 0 | fine chill present |
| 1-5 | 2.95 | 2.05 | 0.70 | 0.02 | 0.02 | 0.015 | 0.037 | balance | 3.63 | type E | 0 | abnormal mixed structure |
| 2-1 | 3.30 | 2.20 | 0.72 | 0.03 | 0.03 | 0.020 | 0 | balance | 4.03 | type A-E | 70 | |
| 2-2 | 3.25 | 2.30 | 0.65 | 0.02 | 0.02 | 0.015 | 0.006 | balance | 4.02 | type A-E | 2 | |
| 2-3 | 3.35 | 2.25 | 0.70 | 0.03 | 0.03 | 0.010 | 0.015 | balance | 4.10 | type A-E | 0 | |
| 2-4 | 3.28 | 2.30 | 0.70 | 0.02 | 0.02 | 0.015 | 0.026 | balance | 4.05 | type A-E | 0 | |
| 2-5 | 3.30 | 2.28 | 0.65 | 0.03 | 0.03 | 0.010 | 0.035 | balance | 4.06 | type A-E | 0 | fine chill mixed structure |
| 3-1 | 3.50 | 2.40 | 0.68 | 0.02 | 0.02 | 0.013 | 0 | balance | 4.30 | type A | 82 | |
| 3-2 | 3.45 | 2.30 | 0.70 | 0.03 | 0.03 | 0.010 | 0.005 | balance | 4.22 | type A | 6 | |
| 3-3 | 3.47 | 2.35 | 0.62 | 0.02 | 0.03 | 0.016 | 0.010 | balance | 4.25 | type A | 0 | |
| 3-4 | 3.45 | 2.40 | 0.75 | 0.03 | 0.02 | 0.015 | 0.022 | balance | 4.25 | type A | 0 | |
| 3-5 | 3.45 | 2.35 | 0.60 | 0.02 | 0.03 | 0.010 | 0.040 | balance | 4.23 | type A | 0 | abnormal mixed structure | the test pieces used in example 2 and the test results. As shown in Table 2, in the case where the cerium addition amount is from 0.010 to 0.035% by weight, the blowhole ratio is zero, that is, the generation of blowholes is extremely low or completely eliminated. Particularly, if the cerium addition amount is from 0.005 to 0.020% by weight, cast iron or chilled cast iron can be formed with extremely less blowhole generation and at a reduced cost.

Further, the scanning rate of the high density energy source can be set to a broad range of from 10 mm/sec to 25 mm/sec in this invention. Furthermore, even if the scanning rate is set to a relatively large value of from 10 mm/sec to 30 mm/sec, a chilled layer with less generation of blowholes and having excellent wear resistance can be formed.

EXAMPLE 2

Figure 1:
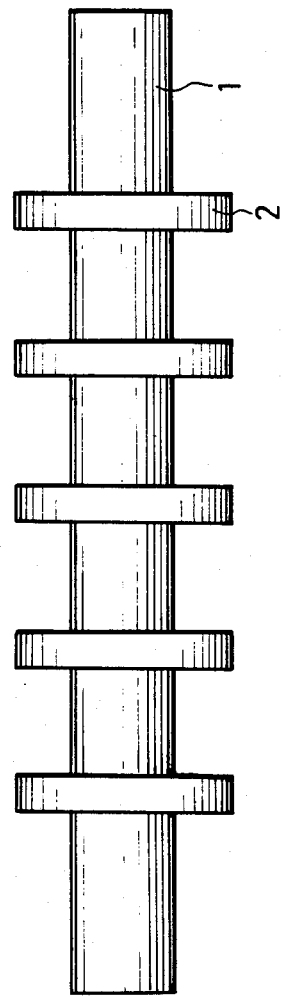
FIG. 1 is a front elevational view of a test piece.
Figure 3:
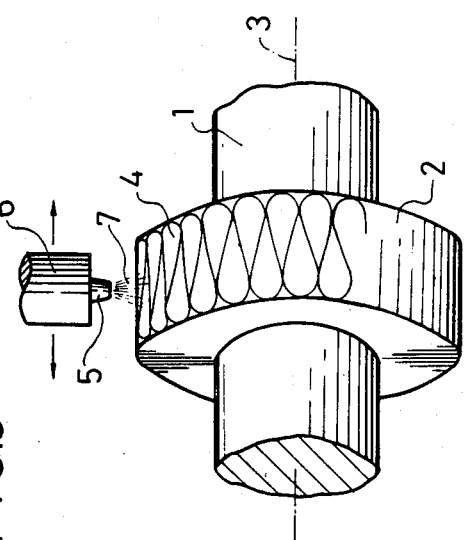
FIG. 3 is an explanatory view in which the test piece shown in FIG. 1 is subjected to remelting treatment by TIG arc.

Test pieces were cast from cast iron materials of various compositions as shown in Table 2. The test piece of 400 mm in total length comprises a shaft portion 1 of 30 mm in diameter and a piece portion 2 of 16 mm in width and 50 mm in diamter. FIG. 1 shows the front elevational view of the test piece, and FIG. 2 shows the right side elevational view. In this case, cerium was added by setting a mischmetal (Ce 50%, La 30%, Nd 15%, Pr 4% and Sm 1%) to the bottom of a ladle. Then, the piece portion 2 of the test piece was lathed to remove by 2 mm depth and the surface of the piece portion 2 was melted under heating by the TIG arc 7 and the remelted chilled layer was formed at that portion by self cooling. In FIG. 3 are shown a nozzle 6, an electrode 5, welding beads 4 and a rotational shaft 3.

Figure 4:
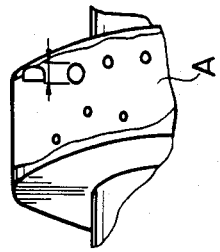
FIG. 4 is an explanatory view showing the blowholes appearing on the fabricated surface when the chilled layer formed by the remelting treatment is removed by machining by 0.5 mm depth and further specifying the blowhole area ratio (a).

The treating conditions were as below:
Current: 90 A (DC)
Voltage: 18 V
Arc length: 2 mm
Rotating speed V: 1 rpm
Torch reciprocating velocity: 14 mm/sec
Shielding gas: Ar 10 l/min
Scanning rate of the TIG arc: 14 mm/sec Then, the chilled layer formed at the surface was removed by machining by 0.5 mm depth and the blowholes appearing on the fabricated surface were observed as shown in FIG. 4, and indicated as blowhole area ratio (a) (mm$^2$/cm$^2$) in Table 2. The blowhole area ratio (a) is a value determined by the following equation:

$$a = \frac{\pi \cdot \Sigma(D^2 \cdot N)}{4 \times A} \times 100$$

D: blowhole diameter
N: blowhole number
A: scanning area

As can be seen from the table, although a lot of blowholes were generated in the test piece formed with a comparison cast iron with no cerium content, when the cerium content was increased to 0.005%, blowhole generation was completely be depressed for the cast iron with low C.E. value 3.63 (No. 1-2). Even when the C.E. value is 4.2 (Ce 0.006%, No. 2-2), or when the C.E. value is 4.22 (Ce 0.005%, No. 3-2), the blowholes area ratio (a) is very low in comparison with a cast iron with no cerium content and blowhole generation was considerably depressed. As the Ce content was further increased, while the blowhole generation itself was maintained in a completely depressed state, when the cerium content was more than 0.035%, mixed structure of pearlite, ferrite and chill were recognized in the cast iron matrix.

Any way, it can be seen from the experiment that when cerium is added as the mischmetal into the molten cast iron, it provides an extremely significant depressing effect against the blowholes generated upon remelting.

What is claimed is:
1. A method for preparing a chilled cast iron article having a chilled layer which comprises:
    (a) adding a mischmetal to an iron material free of magnesium having a C.E. value of not more than 4.3 so as to provide a cerium content of from 0.005 to 0.035% by weight,
    (b) casting said iron material containing cerium, and
    (c) remelting by means of a high density energy source at least a portion of the surface of the cast iron.
2. A method according to claim 1, wherein the cerium content is from 0.010 to 0.035% by weight.

* * * * *